(12) United States Patent
Klatt et al.

(10) Patent No.: US 6,967,848 B2
(45) Date of Patent: Nov. 22, 2005

(54) ADAPTER FOR CONTACTING SMART CARDS

(75) Inventors: Dieter Klatt, Wülfrath (DE); Arnd Bäcker, Hellenthal (DE); Walter Breuer, Berk (DE)

(73) Assignee: STOCKO Contact GmbH & Co. KG, (DE)

( * ) Notice: Subject to any disclaimer, the term of this patent is extended or adjusted under 35 U.S.C. 154(b) by 0 days.

(21) Appl. No.: 10/490,078

(22) PCT Filed: Oct. 16, 2002

(86) PCT No.: PCT/EP02/11558

§ 371 (c)(1),
(2), (4) Date: Mar. 18, 2004

(87) PCT Pub. No.: WO03/036551

PCT Pub. Date: May 1, 2003

(65) Prior Publication Data

US 2004/0243748 A1 Dec. 2, 2004

(30) Foreign Application Priority Data

Oct. 16, 2002 (DE) ............................ 201 17 188 U

(51) Int. Cl.[7] ............................ H05K 5/00; H05K 5/04; H05K 5/06
(52) U.S. Cl. ............ 361/759; 361/732; 361/737; 361/740; 361/741; 361/742; 361/747; 361/756; 361/769; 361/770; 361/801; 439/630
(58) Field of Search .......................... 439/630, 377; 361/728, 732, 736, 737, 740, 741, 742, 747, 361/748, 752, 756, 758, 759, 769, 770, 801, 361/802

(56) References Cited

U.S. PATENT DOCUMENTS

| 5,457,601 A | * | 10/1995 | Georgopulos et al. ...... 361/686 |
| 5,846,092 A | | 12/1998 | Feldman et al. |
| 6,015,092 A | | 1/2000 | Postlewaite et al. |
| 6,075,709 A | * | 6/2000 | Yang .......................... 361/756 |
| 6,272,017 B1 | | 8/2001 | Klatt et al. |

FOREIGN PATENT DOCUMENTS

| DE | 3902230 | 8/1990 |
| DE | 43 10 517 | 10/1994 |
| DE | 295 05 678 | 6/1995 |
| DE | 195 33 569 | 3/1997 |
| DE | 199 25 146 | 12/2000 |
| JP | 112 13 110 | 8/1999 |

OTHER PUBLICATIONS

International Search Report; PCT/EP02/11558; Jan. 15, 2003.

* cited by examiner

*Primary Examiner*—Phuong T. Vu
(74) *Attorney, Agent, or Firm*—Cantor Colburn LLP

(57) ABSTRACT

Adapter for contacting chip cards with a connection of a data processing unit standardized according to a PCMCIA standard, including a plug-in card-like housing which has an insertion slot opening on a front end into a mounting channel for mounting a chip card and a connector panel arranged on an opposite front end, and a printed circuit electrically connected with the connector panel which extends parallel to the mounting channel and which is provided with contact elements for contacting the chip card, where the printed circuit has a length shortened in relation to the mounting channel in the direction of extension of the mounting channel and is provided with an apparatus for positioning the printed circuit and for guiding the chip card in the mounting channel on the front end facing the insertion slot.

15 Claims, 7 Drawing Sheets

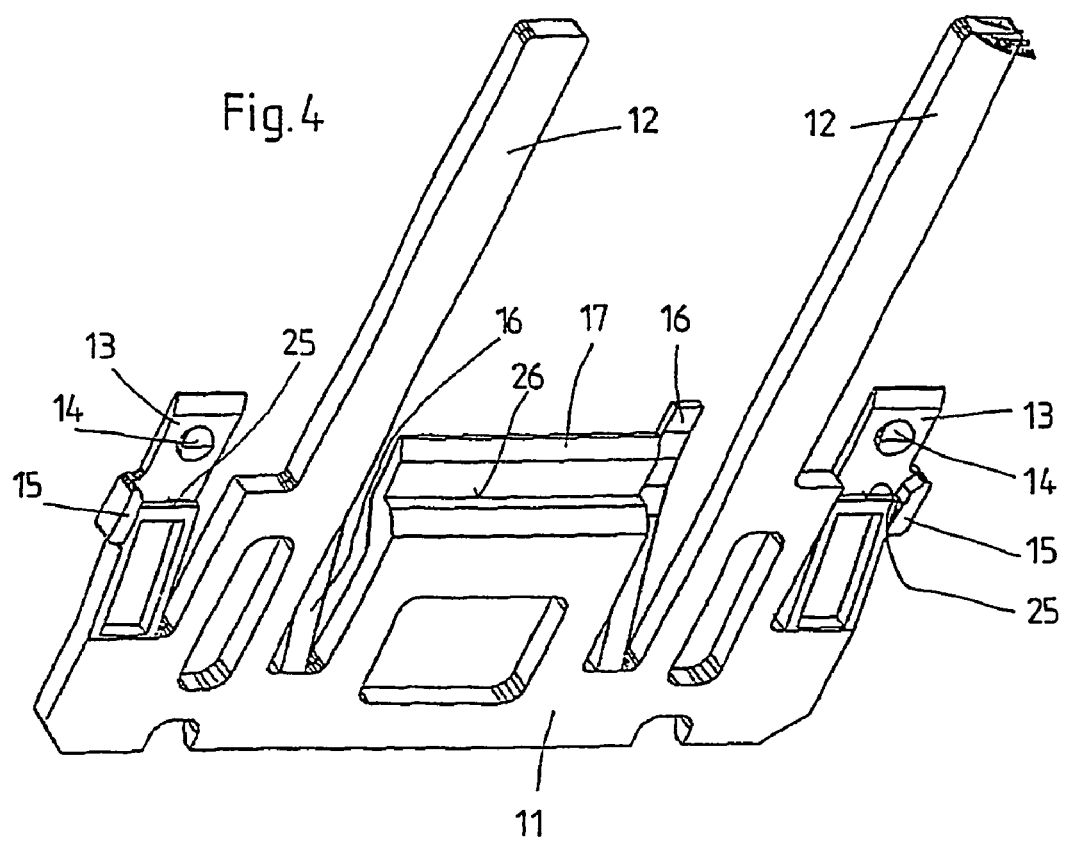

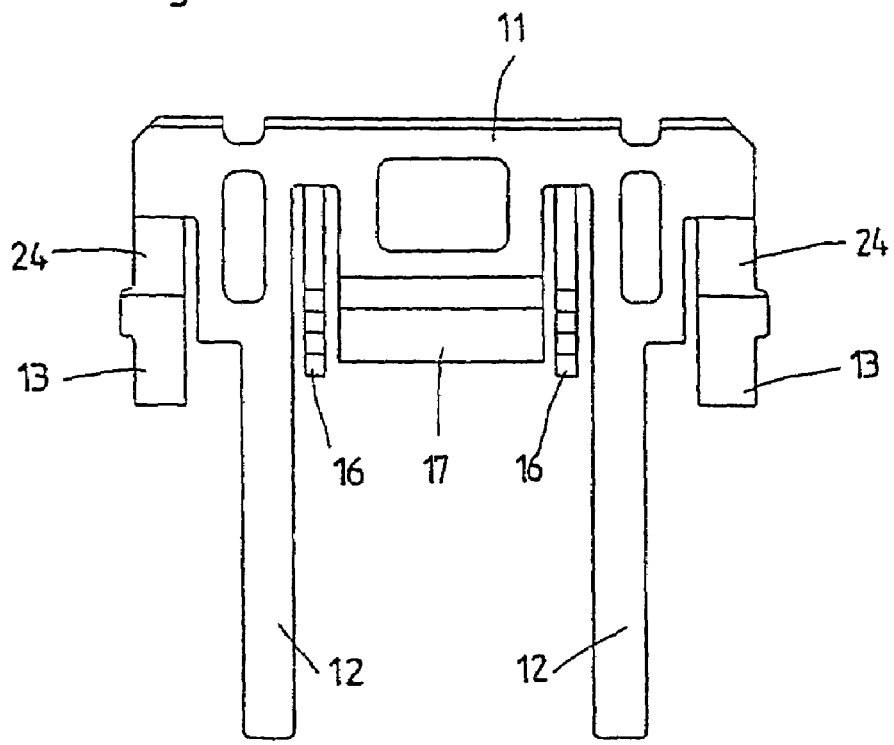
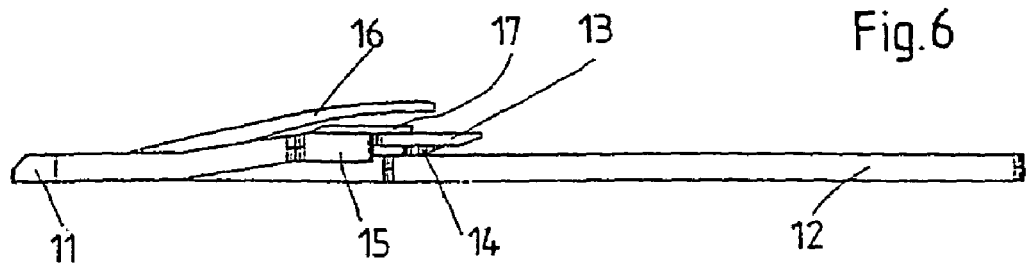
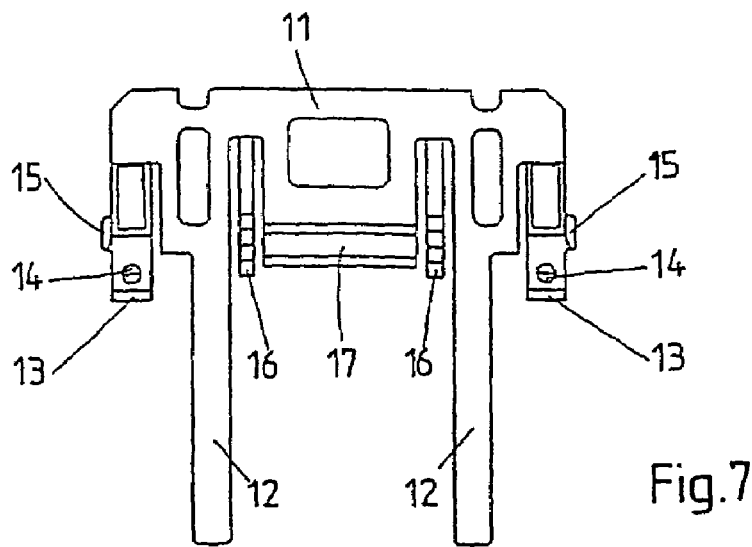

ADAPTER FOR CONTACTING SMART CARDS

TECHNICAL FIELD OF INVENTION

The invention concerns an adapter for contacting chip cards, especially with a connection of a data processing unit standardized according to a Personal Computer Memory Card International Association, (hereinafter, "PCMCIA") standard, with a plug-in card-like housing which has an insert slot opening into a mounting channel for receiving a chip card and a connector panel arranged on the opposite front end, and with a printed circuit electrically connected with the connector panel that extends parallel to the mounting channel and which is provided with contact elements for contacting the chip card.

BACKGROUND OF RELATED ART

The term "chip card" in the above sense should be understood to refer to card-like support elements of electronic components, especially microprocessors on which various retrievable information can be stored. Such chip cards are especially to be encountered in the area of computer technology and are enjoying an ever greater use in connection with the authentication of subjects. Beside this use as identity cards—for example, for operating of access control systems—chip cards are also being increasingly used in non-cash transfers of payment where they, for example, are replacing magnetic strip cards in credit cards or in the framework of POS systems.

Reading devices constructed as a contact unit for reading a chip card are known. These devices—for example, in the form of an adapter system—enable the connection of a chip card to a connector of a data processing system standardized according to the PCMCIA standard. The adapters for this purpose known from prior art have a PCMCIA plug connection socket which connects mechanically and electrically to a PCMCIA plug-in slot in the data processing system. The chip card readout takes place through contact elements arranged in the mounting channel for the chip card which contact said chip card in a manner involving [physical] contact or without [physical] contact—for example, optically or magnetically.

A contact unit for card-like support elements of electronic subassemblies is known from DE 295 05 678. Said contact unit is provided with a base plate of a size suitable for plane-parallel mounting of a card-like support element, at least one printed circuit arranged basically parallel to the base plate with contact elements for the electronic subassemblies of a support elements on its surface, and a connector panel arranged on an edge of the base plate. A plate-like covering element basically congruent with the base plate, together with the printed circuit, forms a slot-like insertion channel and is fastened to the base plate in the region of the connector panel or the corners lying opposite it. The printed circuit, due to its fastening in the housing, fills the entire installation space in the housing.

BRIEF SUMMARY OF INVENTION

The invention refines an adapter for contacting chip cards, especially with a PCMCIA-standardized connection of a data processing unit or the like, of the type mentioned in the opening paragraph of this document, so that the economic advantages of LSI can be exploited in printed circuit manufacturing, so that a simple and economical manufacturing process can be attained which guarantees economical mass production, especially with respect to the increasingly extensive use of specified card systems.

In one embodiment, the invention provides an adapter of the type mentioned in the opening paragraph of this document where the length of the printed circuit extending in the direction of the mounting channel is shortened in relation to the mounting channel and the printed circuit is provided, on the front end facing the insertion slot, with an apparatus for positioning the printed circuit and for guiding the chip card in the mounting channel.

The invention is based upon the knowledge that the printed surface must be reduced to be able to utilize the economic advantages of LSI. This reduction brings about not only a saving in basic printed circuit material, but also increased utility in printed circuit manufacture. Thanks to the device according to the invention for positioning the printed circuit and for guiding the chip card in the mounting channel, the secure contact of a chip card inserted into the mounting channel is guaranteed at the same time, enabling benefit from both cost advantages—saving basic printed circuit material, on one hand, and increased utility in printed circuit manufacture, on the other.

An adapter constructed in this manner can also be easily and economically manufactured and therefore permits mass production in the previously mentioned sense. This is to be attributed to the fact that the float-mounted apparatus advantageously clamping the printed circuit, on one hand, guarantees a secure positioning of the shortened printed circuit in the mounting channel of the adapter housing, and, on the other hand, guarantees a secure guiding and contacting of the chip card in the mounting channel of the adapter housing between the printed circuit and the upper cover plate of the adapter housing.

In a preferred embodiment, the apparatus for positioning the printed circuit has arm-like support elements and arm-like spring elements with a fixed end and a free end, whereby the free ends of the support elements and the spring elements extend in the direction of the contact field onto the sides of the printed circuit located opposite each other. The arm-like support elements and spring elements thus provide functional elements for chip card guidance and printed circuit mounting. Moreover, the printed circuit is clamped in a float-mounted manner between the arm-like support elements and the arm-like spring elements. Due to the fact that the apparatus is directly connected to the printed circuit, the length of the printed circuit can be variably set up as a function of use without changes in the adapter housing or the mounting channel. Printed circuits with a length of up to 40 mm are advantageously used instead of the printed circuit lengths of approximately 75 mm which are usual for PCMCIA adapters, corresponding to a full printed circuit length.

The arm-like spring elements advantageously have cam-like locking devices which engage in corresponding mountings provided on the sides of the printed circuits. The cam-like locking devices are advantageously arranged on the free end of the spring element and the mountings are holes constructed in the printed circuits, preferably indexing holes or depressions constructed in the printed circuit. The locking devices guarantee a secure connection between the printed circuit and the apparatus.

In a further advantageous refinement of the invention, the spring elements have guiding and/or latching devices for positioning the printed circuit on the apparatus. Advantageously, the guiding devices are constructed as straps which are arranged on the spring elements and align with the long sides of the printed circuit.

In a concrete refinement of the invention, the apparatus has two support elements and two spring elements which run parallel to each other at a distance in the direction of extension of the mounting channel and are also separated from each other in a direction perpendicular to the direction of extension of the mounting channel. Advantageously, the support elements and the spring elements are arranged symmetrically toward the front end, preferably so that the spring elements lie inside and the support elements lie outside, especially preferably so that the support elements can be positioned to the left and right of the printed circuit contact elements.

In a further advantageous refinement of the invention, the arms of the spring elements have a protrusion, which serves to guide the chip card, in the direction of extension of the mounting channel.

In a further advantageous refinement of the invention, the apparatus for further guidance of the chip card has arm-like spring elements which extend in the direction of the connector panel and are assembled over the printed circuit up to the contact elements. Advantageously the apparatus also has a ramp-like projection extending between the spring elements, preferably in the center of the front end of the printed circuit in the direction of the connector panel, which extends up to the printed circuit contact elements on the side opposite the support elements. The ramp-like projection is advantageously located somewhat behind the protrusion of the spring elements that are equipped with a locking device, relative to a contact that provides physical contact with the chip card.

A further refinement of the invention provides that the apparatus, advantageously made of plastic is constructed in one piece, preferably as a plastic injection molded part.

Further details, features and advantages of the invention will be explained in greater detail on the basis of embodiments represented in the figures, wherein:

BRIEF DESCRIPTION OF THE DRAWINGS

FIG. 4 Illustrates a further perspective view of the apparatus for positioning the printed circuit and guiding the chip card in the adapter mounting channel;

FIG. 5 Illustrates a top view of the apparatus for positioning the printed circuit and guiding the chip card in the mounting channel according to FIGS. 3 and 4;

FIG. 6 Illustrates a side view of the apparatus for positioning the printed circuit and guiding the chip card in the mounting channel;

FIG. 7 Illustrates a bottom view of the apparatus for positioning the printed circuit and guiding the chip card in the adapter mounting channel;

DETAILED DESCRIPTION OF THE INVENTION

Figure 1:
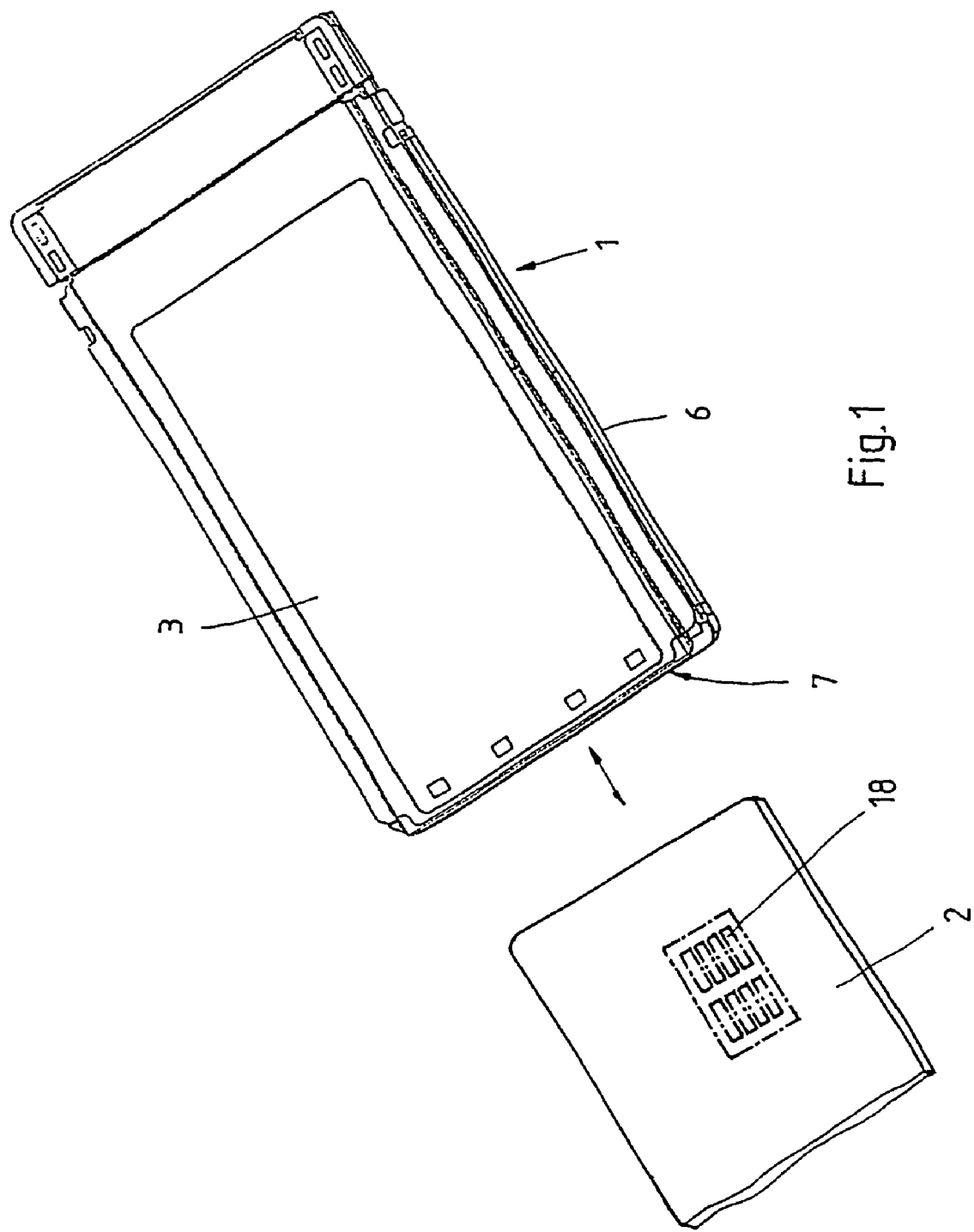
FIG. 1 Illustrates an adapter and a chip card in perspective view.

The adapter 1 represented in FIG. 1 has a housing whose dimensions comply with those of a PCMCIA Type II plug-in card. The housing 3 of the adapter 1 is provided with a PCMCIA connector panel 8 which (as may be seen from FIG. 2) is completely accommodated in the housing 3. The housing 3 has an insertion slot 7 for a chip card 2 which changes into a laterally open mounting channel 6. The chip card is provided with a flat contact field 18 and can be introduced into or pulled out of the housing 3 of the adapter 1 in the direction of the double arrow illustrated.

Figure 2:
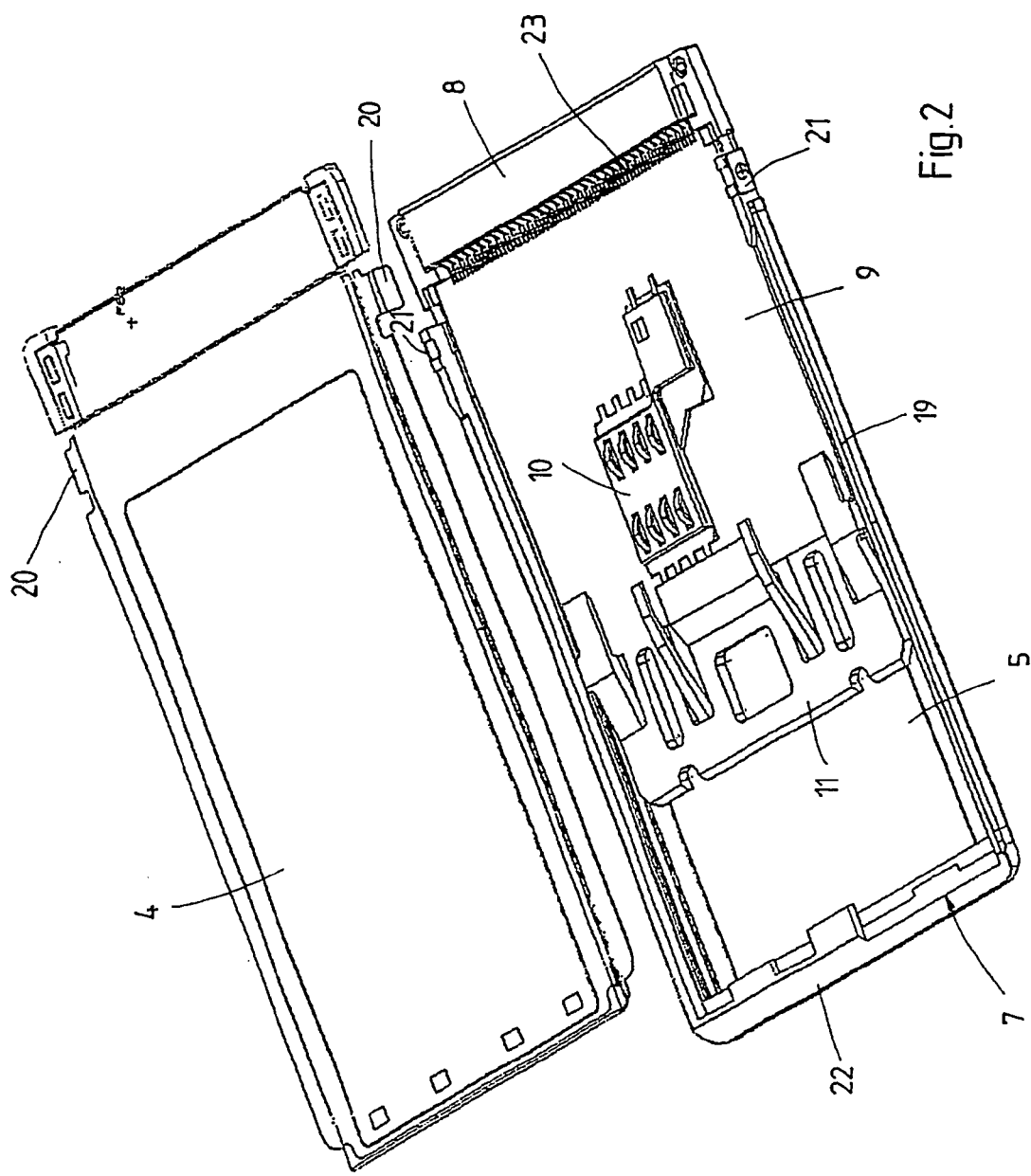
FIG. 2 Illustrates the adapter according to FIG. 1 with removed upper cover plate in a perspective view.
Figure 3:
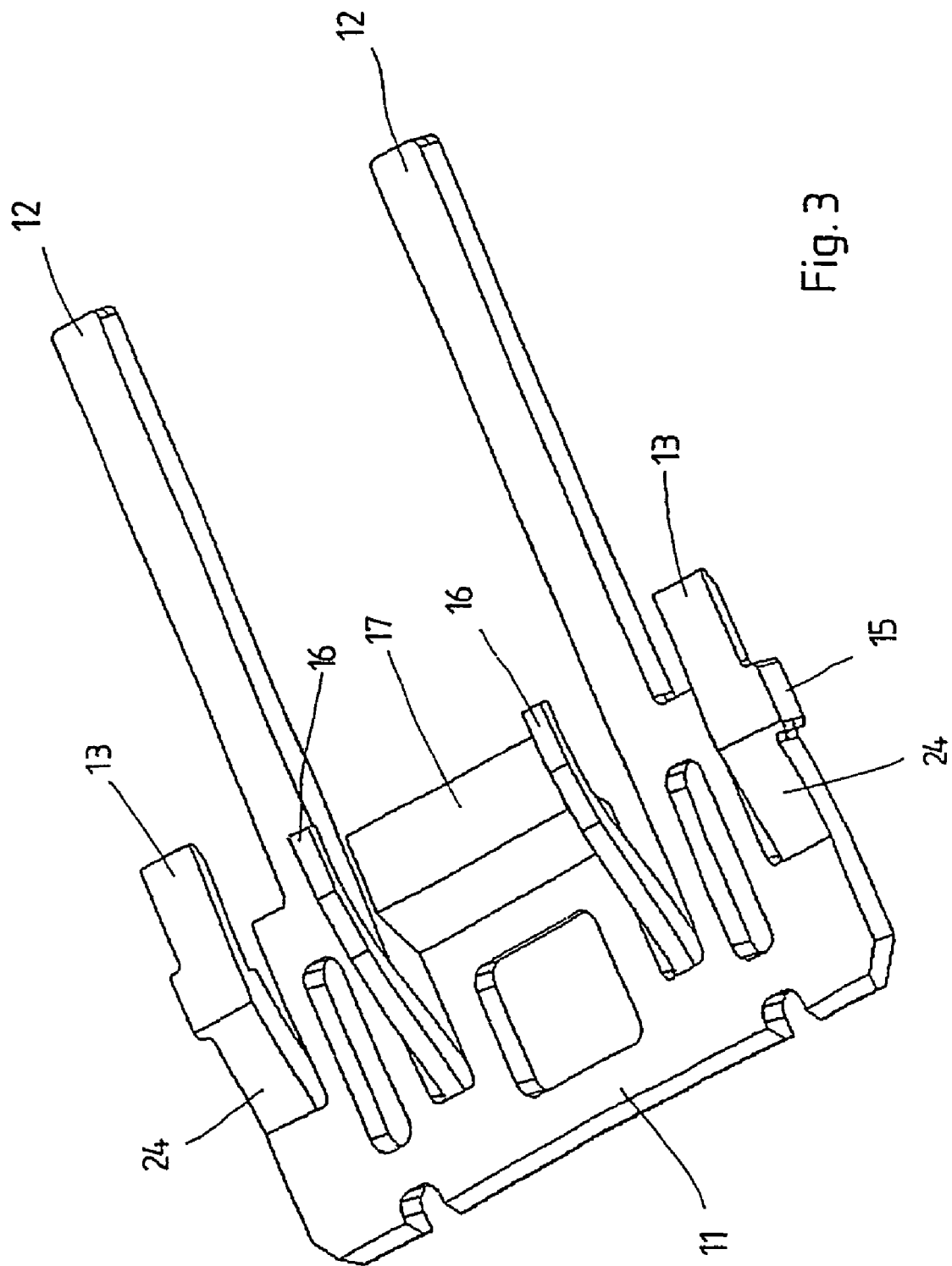
FIG. 3 Illustrates an apparatus for positioning the printed circuit and guiding the chip card in the adapter mounting channel in a perspective view.

As may be seen from FIG. 2, the housing 3 of the adapter 1 consists of an upper cover plate 4 and a lower cover plate 5 which are connected to each other through a frame-like intermediate element 19. The cover plates 4 and 5, made in the form of sheet stamped parts, have orthogonally bent catches 20 and 21 which ensure a simple but load-bearing connection of cover plates 4 and 5 with the intermediate element 19 (which can be constructed in several parts), despite the use of different materials. The intermediate element 19 arranged on the lower cover plate is constructed as a basically U-shaped element whose segments have clamping or guiding sections on their interior contour for accommodating the printed circuit 9 and the apparatus 11. For better insertion of the chip card 2, the intermediate element 19 has a front end inlet slope 22 which enables an easy insertion of the chip card 2 into the mounting channel of the adapter. A high connection rigidity of the housing 3 of the adapter 1 is guaranteed by the frame-like configuration of the intermediate element 19.

The printed circuit 9 has a length shortened in the direction of extension of the mounting channel 6, relative to the mounting channel 6, and is provided with an apparatus 11 for positioning the printed circuit 9 and for guiding the chip card 2 in the mounting channel 6 on the front end facing the insertion slot 7, whereby the apparatus 11 clamps the printed circuit 9 in a float-mounted manner. As shown in FIGS. 3 to 10, the plastic apparatus 11 for positioning the printed circuit 9 has two arm-like support elements 12 and two arm-like spring elements 13 with a fixed end and a free end which run parallel in the direction of extension of the mounting channel 6 and are spaced from each other perpendicular to the direction of extension of the mounting channel 6. The free ends of the support elements 12 and the spring elements 13 moreover extend on sides of the printed circuit 9 lying opposite to each other in the direction of the connector panel 8 which is electrically and mechanically connected to the printed circuit 9 through contact elements 23. The printed circuit length is variably configurable due to the float-mounting of the printed circuit 9 by means of the apparatus 11. Variation of the thickness of the support elements 12 in the direction of extension of the mounting channel adjusts the height for positioning the printed circuit in the mounting channel exists, so that the apparatus 11 for positioning in the mounting channel 6 of the adapter 1 provides for adaptation to printed circuits of various thicknesses. The spring elements 13 have cams 14 in the region of their free end, as depicted in FIGS. 4 and 7, which engage in corresponding holes of the shortened printed circuit 9, as may be seen in FIG. 9. Furthermore, the spring elements 13 for positioning the printed circuit have strap-like guide devices 15 which align with the long sides of the printed circuit 9, as may especially be seen from FIG. 9. The printed circuit 9, shortened in length relative to the mounting channel 6, is clamped in a float-mounted manner between the support elements 12 and spring elements 13 arranged symmetrically toward the front end, whereby the support elements 12 come to lie on the one side and the spring elements 13 on the opposite side, as may be seen from FIGS. 8, 9 and 10. The spring elements 13 are moreover positioned to the left and right of the contact elements 10, in order to make contact with the contact field 18 of a chip card 2. The float-suspended printed circuit, thus floating between the support elements 12 and the spring elements 13 provided with cams 14 as locking devices, can equalize position tolerances within the printed circuit mounting with the aid of the apparatus 11.

Herein, it is described that the apparatus float-clamps the printed circuit, meaning that the apparatus releasably retains one end of the printed circuit while the opposite end of the printed circuit extends freely away from the apparatus and further meaning that the apparatus may be variably positioned within the housing.

Figure 8:
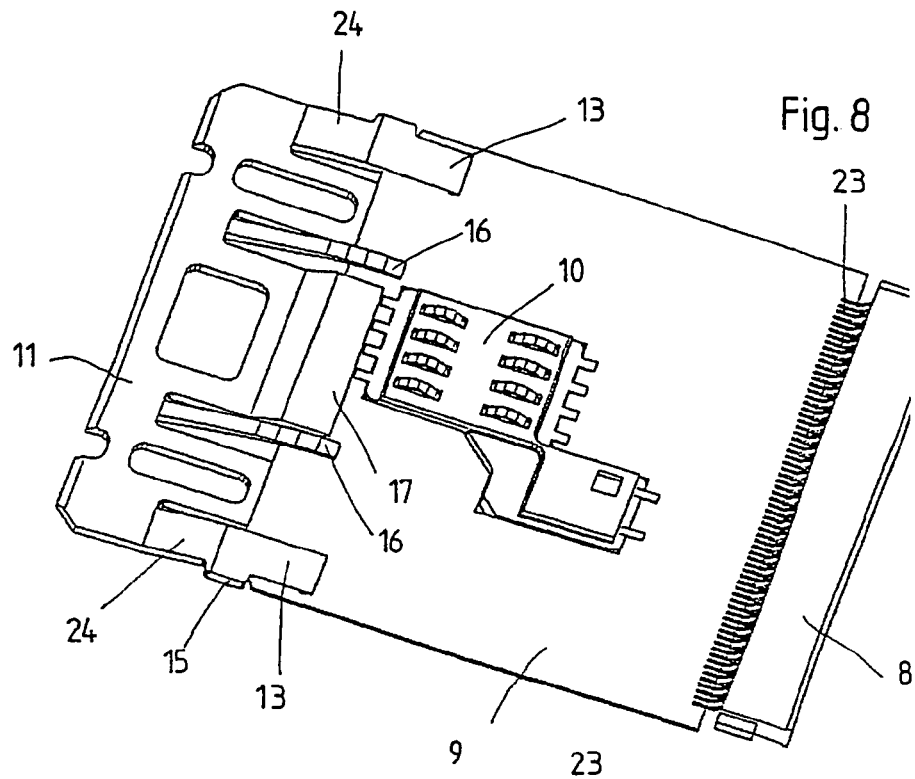
FIG. 8 Illustrates a top view in perspective of a printed circuit provided with the apparatus for positioning the printed circuit and guiding the chip card in the adapter mounting channel.
Figure 10:
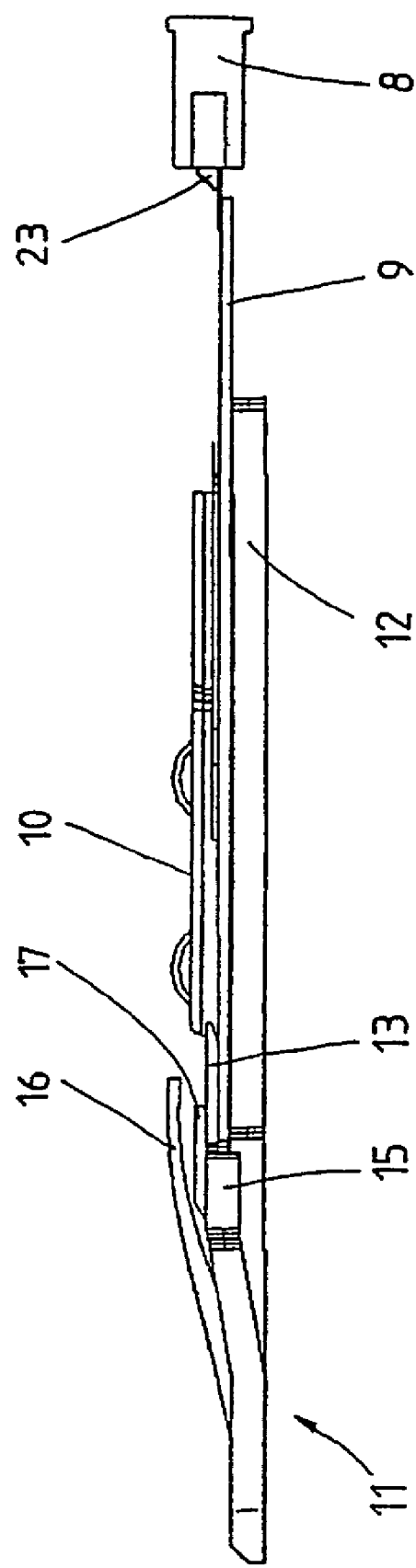
FIG. 10 Illustrates a side view of a printed circuit provided with the apparatus for positioning the printed circuit and guiding the chip card in the adapter mounting channel.

The apparatus 11 has arm-like spring elements 16 for guiding the chip card 2 which extend in the direction of the connector panel 8 on the side opposite the support elements 12 and are assembled over the printed circuit 9 up to the contact element 10, as represented in FIGS. 8 and 10. The spring elements 16 are arranged symmetrically toward the front end of the printed circuit. Furthermore, the apparatus 11 has a ramp-like projection 17 extending in the direction of the connector panel 8 between the spring elements 16 axially toward the front end of the printed circuit 9; said ramp-like projection 17 extends on the side opposite the support elements 12 up to the contact elements 10 of the printed circuit 9. The ramp-like projection 17 and the protrusion 24 of the spring elements 13 are adjusted toward each other with respect to a physical contact with the chip card 2 while guiding the chip card 2 when inserting the chip card 2 into the mounting channel 6 so that the ramp-like projection 17 trails behind the protrusion 24 of the spring elements 13. The protrusion 24 of the spring elements 13 is constructed trailing behind the assembly of the spring elements 16 with respect to a physical contact with the chip card 2.

Figure 9:
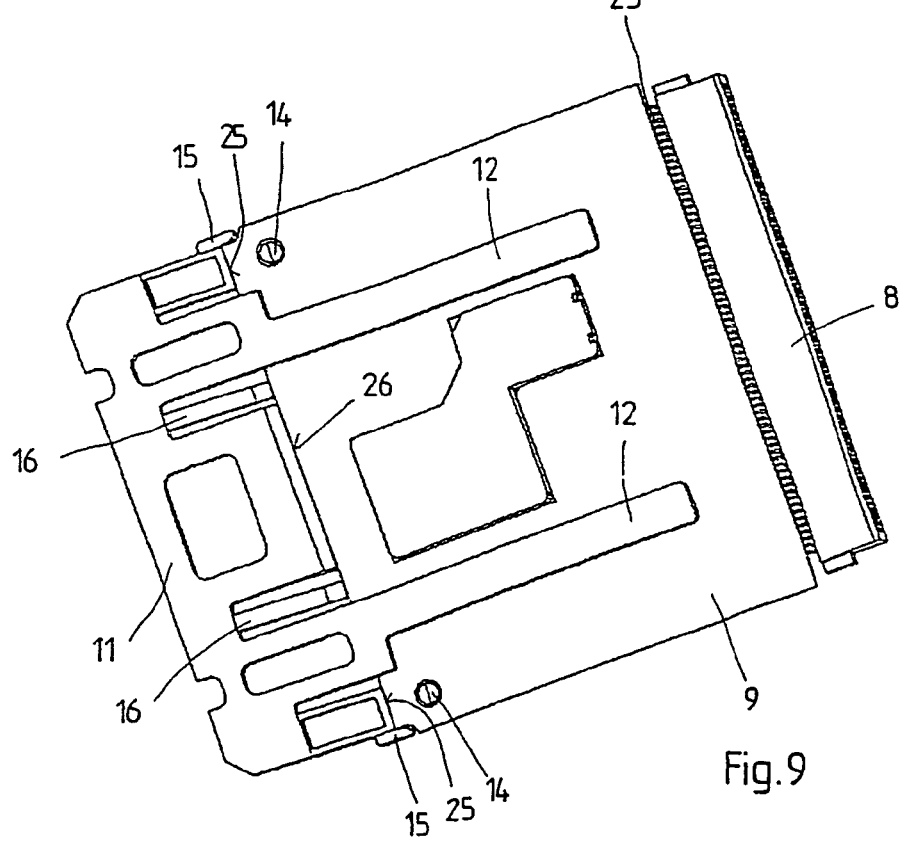
FIG. 9 Illustrates a bottom view in perspective of a printed circuit provided with the apparatus for positioning the printed circuit and guiding the chip card in the adapter mounting channel.

As may be seen from FIGS. 8 and 9, the projection 17 and the spring elements 15 have a contact surface 25 or 26 for the front end of the printed circuit 9; these contact surfaces serve for defined positioning of the printed circuit 9 on the apparatus 11.

The embodiments represented in the figures merely serve to explain the invention and are not intended in a restrictive manner.

What is claimed is:

1. Adapter for contacting chip cards with a connection of a data processing unit standardized according to a PCMCIA standard, comprising: a plug-in card-like housing which has an insertion slot opening on a front end into a mounting channel for mounting a chip card and a connector panel arranged on an opposite front end; and a printed circuit electrically connected with the connector panel which extends parallel to the mounting channel and which is provided with contact elements for contacting the chip card; wherein the printed circuit has a length shortened in relation to the mounting channel in the direction of extension of the mounting channel and is provided with an apparatus for positioning the printed circuit and for guiding the chip card in the mounting channel on the front end facing the insertion slot; wherein the apparatus float-clamps the printed circuit.

2. Adapter according to claim 1, wherein the apparatus for positioning the printed circuit has arm-like support elements and arm-like spring elements with a fixed end and a free end, whereby the free ends of the support elements and the spring elements extend on opposite sides of the printed circuit in the mountings of the connector panel.

3. Adapter according to claim 2, wherein the spring elements have cam-like locking devices which engage in corresponding mountings provided on the printed circuit.

4. Adapter according to claim 3, wherein the locking devices are arranged on the free end of the spring element.

5. Adapter according to claim 3, wherein the mountings are indexing holes constructed in the printed circuit.

6. Adapter according to claim 3, wherein the mountings are depressions constructed in the printed circuit.

7. Adapter according to claim 2, wherein the spring elements have guide elements for positioning the printed circuit on the apparatus.

8. Adapter according to claim 2, wherein the apparatus has two support elements and two spring elements which preferably run parallel to each other in the direction of extension of the mounting channel and are spaced from each other perpendicular toward the direction of extension of the mounting channel.

9. Adapter according to claim 8, wherein the support elements and the spring elements are arranged symmetrically toward a front end, so that the spring elements lie outside and the support elements lie inside, so that the support elements can be positioned to a left and a right of the contact elements, respectively, of the printed circuit.

10. Adapter according to claim 2, wherein an arm of the spring elements has a protrusion serving to guide the chip card in the direction of extension of the mounting channel.

11. Adapter according to claim 10, wherein the apparatus for guiding the chip card has arm-like spring elements which extend in the direction of the connector panel and are assembled over the printed circuit up to the contact elements.

12. Adapter according to claim 11, wherein the apparatus has a ramp-like projection extending in the direction of the connector panel between the spring elements, axially toward the front end, which extends on a side of the printed circuit opposite the support elements up to the contact elements of the printed circuit.

13. Adapter according to claim 12, wherein the ramp-like projection trails behind the protrusion and the assembly of the spring elements with respect to a contact with the chip card when guiding the chip card.

14. Adapter according to claim 1, wherein the apparatus is constructed in one piece.

15. Adapter according to claim 1, wherein the apparatus is a plastic injection molded part.

* * * * *